Patented Jan. 30, 1923.

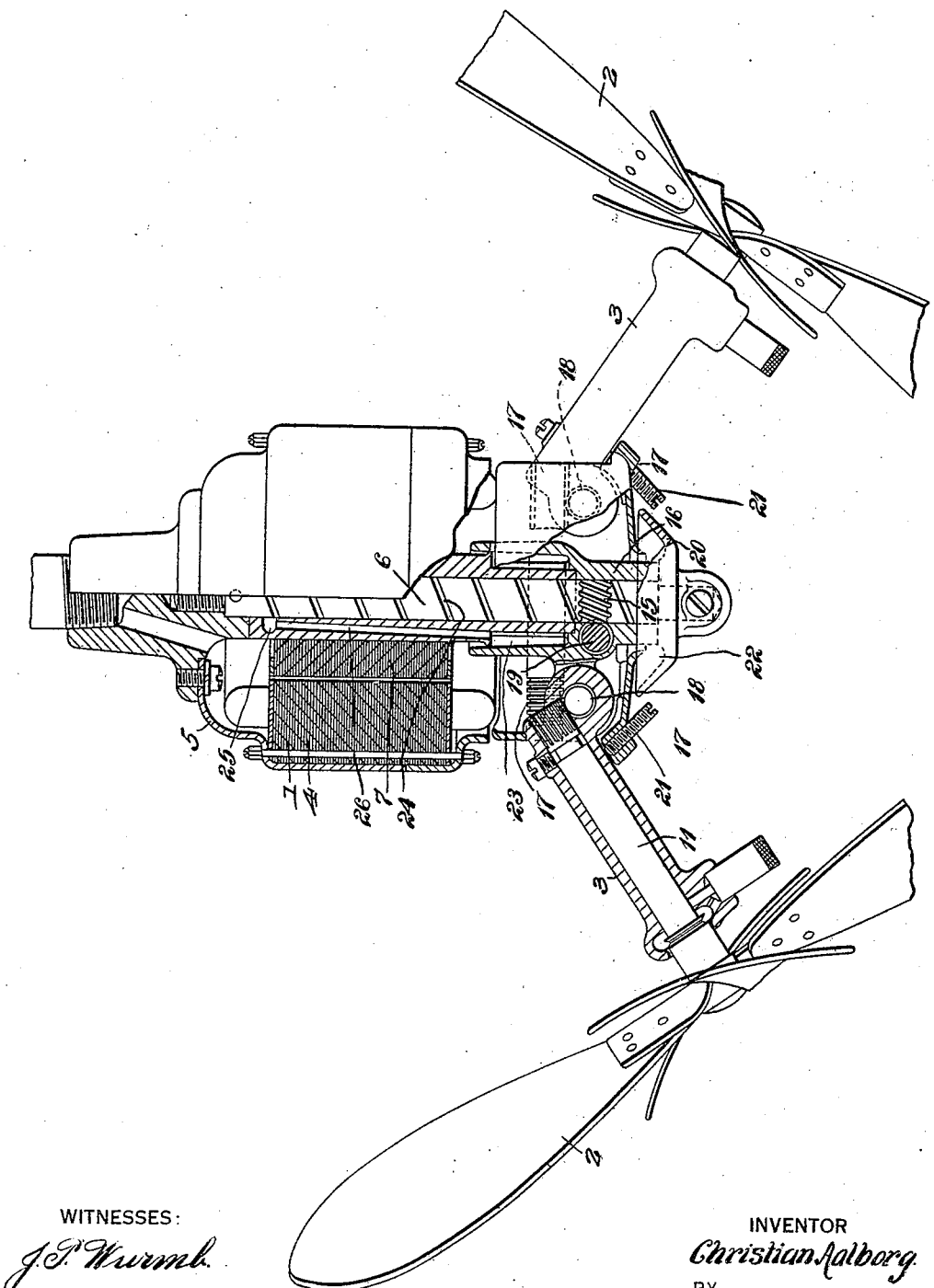

1,443,551

UNITED STATES PATENT OFFICE.

CHRISTIAN AALBORG, OF PITTSBURGH, PENNSYLVANIA, ASSIGNOR TO WESTINGHOUSE ELECTRIC & MANUFACTURING COMPANY, A CORPORATION OF PENNSYLVANIA.

CEILING FAN.

Application filed November 4, 1918. Serial No. 260,968.

*To all whom it may concern:*

Be it known that I, CHRISTIAN AALBORG, a citizen of the United States, and a resident of Pittsburgh, in the county of Allegheny and State of Pennsylvania, have invented a new and useful Improvement in Ceiling Fans, of which the following is a specification.

My invention relates to ceiling fans, having particular relation to the driving connection between the fan blades and the electric motor thereof, and it has for its object to provide a novel system of lubrication which shall be simple in construction, positive and durable in operation and relatively inexpensive to manufacture.

The accompanying drawing is a sectional view of a ceiling fan embodying my invention.

In the drawing, I show a fan comprising a motor 1 and a plurality of sets of fan blades 2 mounted on supporting arms 3 that project from said motor 1. The motor consists of a stator member 4, a casing 5 therefor, a stationary shaft 6, and a rotor member 7 mounted upon a sleeve 8 which, in turn, is concentrically mounted upon, and supported by, the stationary shaft 6. The sleeve 8 is provided with a worm-threaded portion 9 at its lower end to mesh with two worm threaded shafts 17 which, in turn, drive worm-threaded shafts 18, and the latter drive fan shafts 11. One of the shafts 17 also drives a worm-threaded shaft 19. The shaft 19 operatively engages a worm-threaded portion 15 of the stationary shaft 6, thus causing rotation of the fan sets about the shaft 6. The fan-supporting arms are mounted on a slow-speed sleeve 16 which forms bearings for the shafts 17, 18 and 19. The position of each of the fan sets is adjusted independently by means of a set screw 21, which moves the fan-driving shaft 11 about the axis of the worm-threaded shaft 18 as an axis.

The lubrication system comprises an oil reservoir 22 at the lower end of the shaft 6 and an additional reservoir 23 disposed at the junction of the high and low-speed sleeves 8 and 16, thus insuring a supply of oil at that important point. The shaft 6 is provided with helical grooves 24 whereby the oil is carried vertically along the shaft to a chamber 25 from which it drains back into the reservoir 23 by means of a passage 26. Oil, overflowing from the reservoir 23, drains into the reservoir 22, thus preventing the dripping of any oil therefrom.

While I have shown my invention in a plurality of forms, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:

1. In a mechanism provided with a plurality of telescoping shafts, a single lubricating system comprising lubricant receptacles disposed adjacent the ends of each of said shafts.

2. In a mechanism provided with vertically extending telescoping shafts, a lubricating system comprising a lubricant receptacle disposed adjacent to each end of each of said shafts, one of said shafts having means for moving said lubricant vertically along itself from one of said receptacles to the other.

3. In a mechanism provided with a plurality of shafts disposed in end-to-end relation, a lubricating system comprising lubricant receptacles disposed adjacent the ends of said shafts.

4. In a mechanism provided with a plurality of shafts disposed in end-to-end relation, a lubricating system comprising lubricant receptacles disposed at the end of one of said shafts and the point where said shafts meet, and means for moving said lubricant along said shafts.

5. In a mechanism provided with a plurality of vertical shafts disposed in end-to-end relation, a lubricating system comprising lubricant receptacles disposed at the point where said shafts meet and at the lower end of the lower shaft, and means integral with said shaft for moving the oil vertically along itself.

6. In a mechanism provided with a stationary vertical shaft and a plurality of rotatable hollow shafts concentrically mounted thereupon in end-to-end relation, a lubricating system comprising a lubricant receptacle surrounding the lower end of the lower hollow shaft, and an additional lubricant reservoir surrounding the point where said hollow shafts meet in end-to-end relation, and grooves disposed on said stationary shaft whereby said lubricant is moved vertically along itself.

In testimony whereof, I have hereunto subscribed my name this 23rd day of Oct., 1918.

CHRISTIAN AALBORG.